United States Patent [19]

Cornwall

[11] 4,233,697
[45] Nov. 18, 1980

[54] PROTECTIVE FLANGE COVER AND METHOD OF USE

[76] Inventor: Kenneth R. Cornwall, 30064 Bentley, Livonia, Mich. 48154

[21] Appl. No.: 972,956

[22] Filed: Dec. 26, 1978

[51] Int. Cl.³ .............................................. A47K 1/14
[52] U.S. Cl. ..................................... 4/293; 4/252 R; 4/295; 220/327; 285/57; 285/58
[58] Field of Search .............................. 220/327, 328; 285/56–60; 4/286, 252, 295, 293

[56] References Cited

U.S. PATENT DOCUMENTS

| | | | |
|---|---|---|---|
| 1,317,963 | 10/1919 | Cosgrove | 285/57 |
| 2,800,242 | 7/1957 | Sauthoff | 220/327 X |
| 3,015,501 | 1/1962 | Minella | 285/58 |
| 3,098,578 | 7/1963 | Rudelick | 220/327 X |
| 3,181,585 | 5/1965 | Brewington | 151/41.75 |
| 3,339,215 | 9/1967 | Flood | 4/252 R |
| 3,418,669 | 12/1968 | Maxwell | 4/286 |
| 3,445,973 | 5/1969 | Stone | 4/293 X |
| 3,709,401 | 1/1973 | Walstrom | 220/327 |
| 3,846,851 | 11/1974 | Pepper | 4/252 R |
| 4,052,759 | 10/1977 | Hill | 4/252 R |
| 4,090,267 | 5/1978 | Cuschera | 4/252 R |
| 4,144,599 | 3/1979 | Cuschera | 4/295 X |

*Primary Examiner*—Henry K. Artis
*Attorney, Agent, or Firm*—Ian C. McLeod

[57] ABSTRACT

A protective cover or cap for connection to a toilet mounting flange installed on a drain or discharge pipe is described. The cover protects the stems of bolts for connecting the flange to the toilet by means of at least two tubular extensions on the cover which surround the bolts and by means of nuts over washers on the bolt stems when the cover is installed on the flange. The cover makes it much easier to align the flange visually with the surrounding walls by means of the tubular extensions for the bolts. In addition, the cover is adapted for hydrostatic testing of the drainage system, prevents any foreign material from entering the discharge pipe and protects the slots and holes in the flange from becoming clogged or filled.

6 Claims, 3 Drawing Figures

4,233,697

PROTECTIVE FLANGE COVER AND METHOD OF USE

BACKGROUND OF THE INVENTION

1. Field of the Invention

The present invention relates to a protective cover or cap for an installed drain pipe flange adapted for mounting toilet bowls. In particular, the present invention relates to a cover which protects the toilet bowl flange and which protects and holds the mounting bolts for the toilet bowl.

2. Description of the Prior Art

There is a well developed prior art in the use of mounting flanges for toilet bowls on drain or discharge pipe. Illustrative are the flanges described in U.S. Pat. Nos. 3,181,585; 3,339,215; and 4,090,267. The current building practice is to use plastic pipe extending from a plastic mounting flange for the toilet bowl.

The mounting flange includes two opposed semicircular slots on the flat receiving surface of the flange which allow for inserting and then locking mounting bolts perpendicular to the surface. An especially useful prior art mounting bolt includes a plastic head with internal threads for a correspondingly threaded stem or stud. The head has lateral projections or ears on two opposing sides to loosely hold the bolt head in place in the slot in the flange prior to mounting the toilet bowl.

One problem which has been faced by the prior art is that the flange is installed on the drain pipe early in the building construction long before the toilet bowl is in place. Current practice is to cover the flange opening with duct tape, paper, burlap bags or anything handy which are easily dislodgable. As a result, the debris from construction most often goes through the opening in the flange and into the drain pipe causing plugging. Since the flange is on the floor, debris almost always accumulates in the pipe. The flange openings and face can become encrusted with tile grout. Cleaning is time consuming and expensive and the flange can be broken. U.S. Pat. No. 3,846,851 describes a flange which incorporates an integral knockout plug; however, there is a chance that the flange can be damaged in the removal of the plug. The flange is still subject to damage before the toilet bowl is mounted.

Another prior art procedure is hydrostatic testing after the flange is installed on the drain pipe. Current practice is to use plugs or expandable rubber balls to block the opening in the flange. These plugs are expensive and are not left in the flange after testing is completed so that the toilet bowl receiving surface of the flange is not protected. These devices do not produce a positive seal in the flange opening and do not test the flatness of the flange face.

SUMMARY OF THE INVENTION

The present invention relates to a cover adapted for closure of a toilet bowl mounting flange mounted on a drain pipe having a tubular flange opening leading to the drain pipe and having a flat toilet bowl receiving surface with at least two slots for inserting and holding bolt heads having threaded bolt stems which project from the flange for mounting the toilet bowl on the flange using nuts and washers on the stems which comprises; a plate which covers and seals the tubular flange opening and toilet bowl receiving surface; and at least two tubes with openings through the plate positioned on the plate to receive the stems of the bolts mounted on the flange in the slots so that the stems project above the tubes sufficiently to receive a nut over a washer on the stem and so as to essentially cover the threads on the stem.

The present invention also relates to the method for protecting and hydrostatically testing toilet bowl mounting flanges mounted on a drain pipe having a tubular flange opening leading to the drain pipe and having a flat toilet bowl receiving surface with slot means for inserting and holding bolt heads having threaded stems which project from the flange for mounting the toilet bowl on the flange using nuts over washers on the stems comprising the steps of mounting a plate on the flat surface of the flange with at least two toilet bowl mounting bolts, so that the plate covers and seals the flange opening as a cover, the plate having at least two tubes with openings positioned to receive the stems of the bolts mounted on the flange in the slot means so that the stems project above the tubes sufficiently to receive a nut over a washer on the stem so as to essentially cover the threads on the stem; hydrostatically testing the covered flange to determine if there are leaks in the flange or drain pipe; and repairing any leaks in the flange or drain pipe or replacing the flange.

OBJECTS

It is thus an object of the present invention to provide a protective cover for the toilet bowl mounting flange which prevents debris from entering the pipe and which protects the face of the flange and which mounts and protects the bowl mounting bolts. It is also an object to provide a cover for hydrostatic testing of the flange and drain pipe. These and other objects will become increasingly apparent by reference to the following description and the drawings.

IN THE DRAWINGS

SPECIFIC DESCRIPTION

Figure 1:
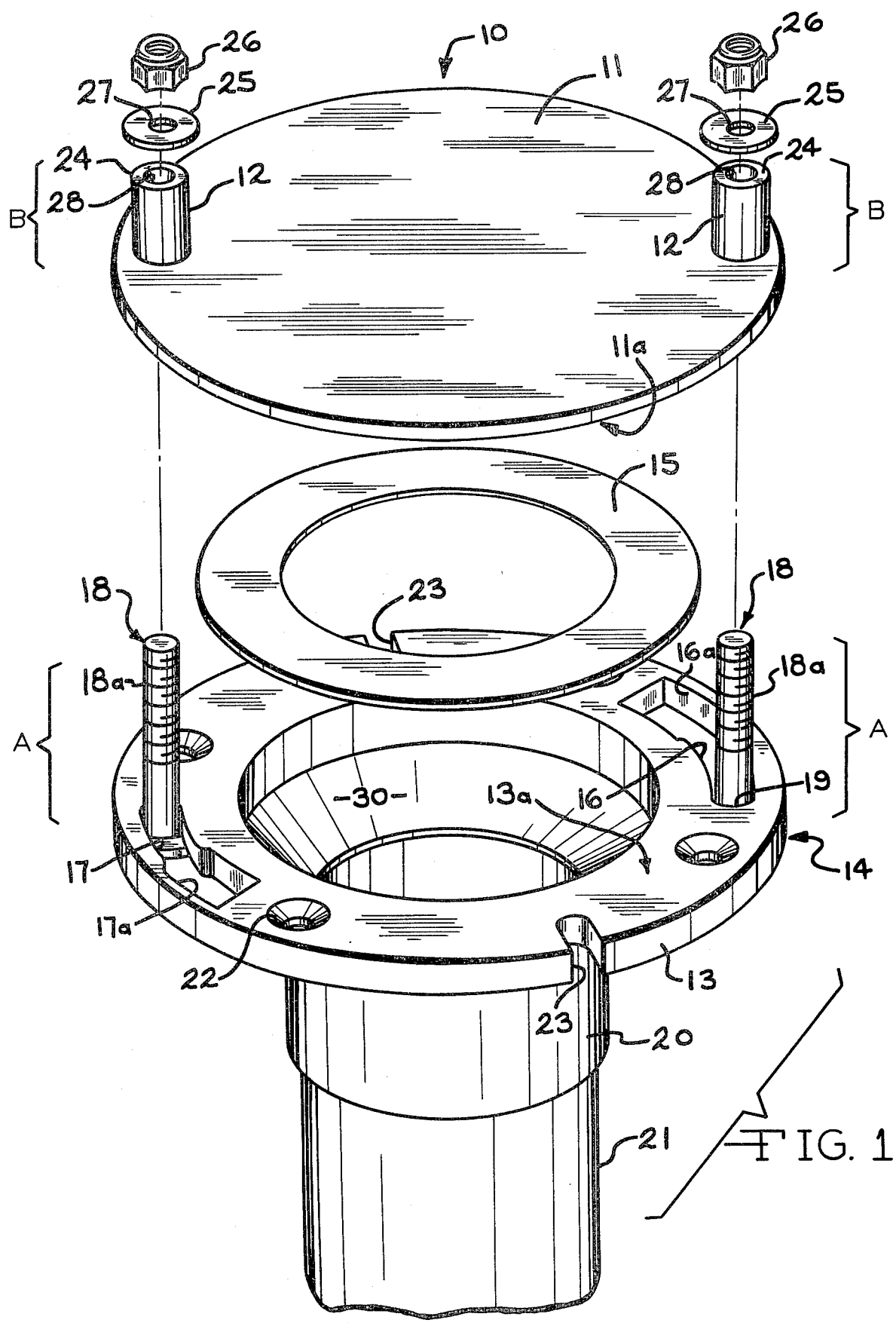
FIG. 1 is a front perspective view of a protective cover of the present invention showing the cover with two tubular extensions separated from the bolts, washers and nuts and from the mounting flange.

Referring to FIG. 1, a cover 10 according to the present invention is shown. A disc shaped plate 11 with tubes 12 extending from the plate 11 is provided with a flat flange engaging surface 11a adapted to mate and seal with the flat toilet bowl receiving surface 13a on the lips 13 of the flange 14. A ring seal 15 is preferably provided between the surfaces 11a and 13a which can be separate as shown or attached to the flange 14 or cover 11. The flange 14 includes arcuate slots 16 and 17 in the lip 13 for receiving and holding bolts 18. The slots 16 and 17 include a widened portion 16a or 17a for inserting the bolt head 19 into the respective slots 16 and 17. The flange 14 includes a conventional base 20 for mounting on a drain pipe 21, holes 22 for inserting flooring screws (not shown) and peripheral locating slots 23 on the lip 13.

The bolts 18 have a stem 18a length A which are longer than the height B of tubes 12 such that a portion of the threaded stems 18a projects above the tops 24 of tubes 12. The portion of the stems 18a above the tubes 12 mounts washers 25 and nuts 26. The washers 25 have holes 27 for the stems 18a and cover the tops 24 of the tubes 12.

In use, the cover 11 is attached to the flange 14 by means of bolts 18 in the tubes 12, thereby protecting the threaded stem 18a portions A of the bolts 18 which are available for future use in attaching a toilet bowl (not shown) to the flange 14. After the cover 10 is attached, the pipe 21 and flange 14 are hydrostatically tested to determine if there are water leaks between the base 20 and the drain pipe 21 also, and importantly, between the mating faces 11a and 13a of the cover 10 and flange 14. A leak can indicate a warped face 13a on the flange 14 requiring replacement of the flange 14. It is thus important that the cover 10 be adapted to perform the hydrostatic test and therefore the seal 15 should preferably be mounted on the face 11a of the cover 11. The cover 10 is removed upon installation of the toilet bowl (not shown); however, it may be a period of several months before this step takes place during construction. Since it is usually made inexpensively of plastic, the cover 10 can be discarded.

Figure 2:
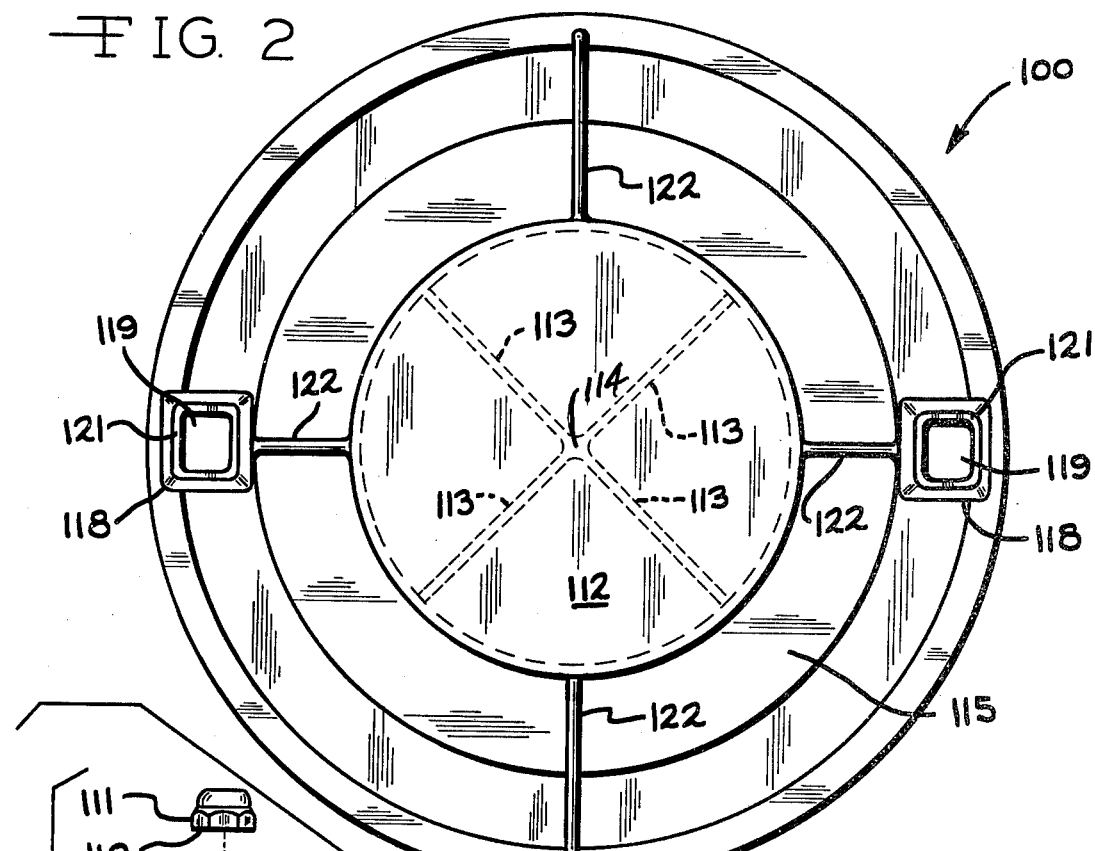
FIG. 2 is a plan view of the preferred protective cover of the present invention showing a rectangular cross-sectioned hole in two tubular extensions.
Figure 3:
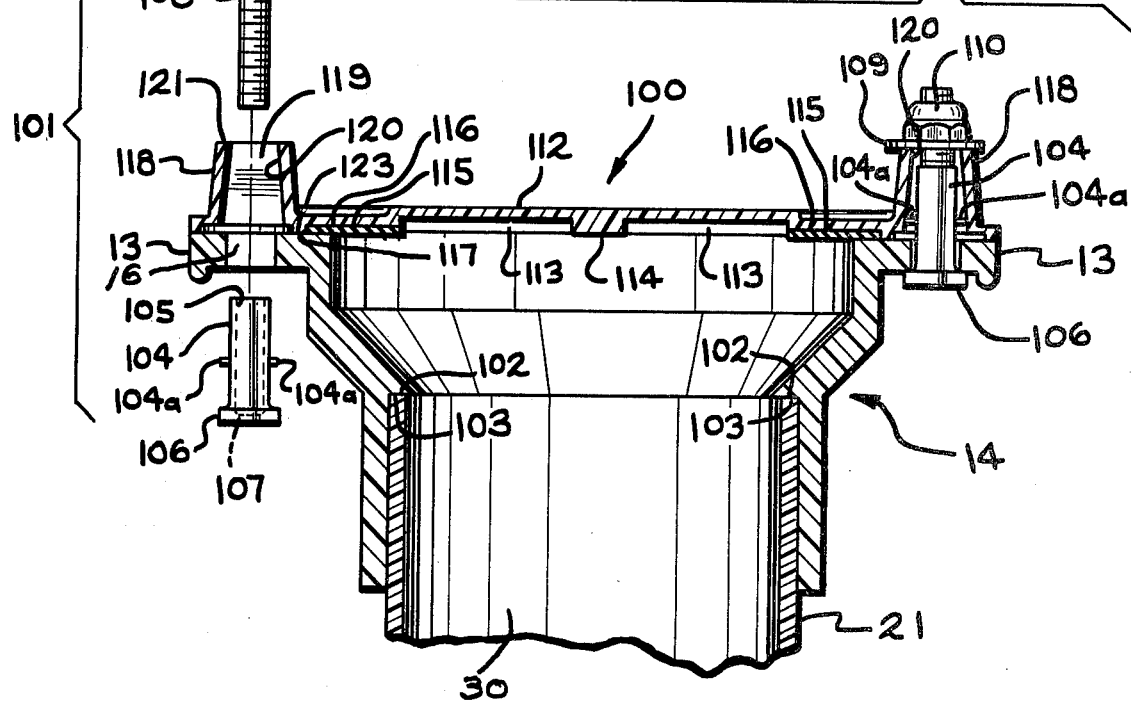
FIG. 3 is a front cross-sectional view of the preferred protective cover of FIG. 2 installed on a conventional flange using a preferred prior art mounting bolt with a rectangular cross-sectioned head, washer, and nut.

Referring to FIGS. 2 and 3, the preferred cover 100 of the present invention is shown as an integral assembly adapted for a preferred prior art bolt and nut assembly 101. FIG. 3 shows the cover 100 mounted on a flange 14. An annular retaining lip 102 is provided around the inside of the flange 14 to locate and seal with the end 103 of the pipe 21. The prior art bolt assembly 101 includes a rectangular cross-sectioned head 104 preferably made of plastic, with an internally threaded hole 105, a base 106 and a thin frangible portion 107; a threaded stem 108 which screws into hole 105, a washer 109 and a nut 110 with internal threads 111. The head 104 includes lateral projections 104a which initially serve to loosely hold and position the bolt head 104 in the slot 16 or 17 such that it does not fall through the slot 16 or 17.

The cover 100 includes a thin central dome portion 112 supported by internal ribs 113 in an "X" pattern which radially intersect at 45° angles at the center 114 of the dome portion 112. The dome portion 112 is centered over the hole 30 of the flange 14 and tends to tighten the ring seal 116 on the flange face 13a when hydrostatic pressure is applied. Around the dome portion 112 is an integral ring 115 which extends to the periphery of the lips 13 of the flange 14. The ring 115 supports flat ring seal 116 in a recess 117. Adjacent to the ring seal 116 are two tubes 118 with rectangularly cross-sectioned holes 119 that have an inwardly tapered surface 120 above the dome portion 112. The tops 121 of the tubes 118 are flat so as to mate with the flat washers 109. Reinforcing radial external ribs 122 are provided on the outside of the cover 100 at an angle of 45° to the internal ribs 113. The combination of ribs 113 and 122, a flat surface 123 on ring 115 and the ring seal 116 provide a cover 100 which closes and seals a properly constructed flange so that irregularities on the surface 13a of the lips 13 of a defective flange 14 can be detected.

The rectangular tapered hole 119 fits the rectangular cross-sectioned bolt head 104 which is also rectangular such that the ears 104a on the head 104 project slightly into the hole 119 and locate against the tapered surface 120. The bolt head 104 does not turn in the hole 119 when the nut 110 is tightened on stem 108. The hole 119 also keeps the bolt stem 108 accurately positioned in the hole 119 so that the bolt assembly 101 acts to clamp the cover 100 accurately on the flange 14. The use of the cover 100 is identical to that for the cover 10 described in FIG. 1.

The flange 13a surface can be installed perpendicular to bathroom walls visually using the tubular extensions 24 or 118 which are aligned to be parallel to the wall. Even with a level, this can be a problem while the flange is being cemented to the drain pipe 21.

There are numerous possible variations in the functional construction of a cover with tubes projecting from the cover for enclosing bolt stems. The exact construction will depend in part upon the bolt being used. It will be appreciated that the tubes for the bolts can be integral with the cover or made of a different material. All of these variations will be obvious to those skilled in the art based upon the foregoing description.

I claim:

1. A cover with an inside and an outside surface adapted for closure of a toilet bowl mounting flange mounted on a drain pipe having a tubular flange opening leading to the drain pipe and having a flat toilet bowl receiving surface with two slots for inserting and holding bolt heads having threaded bolt stems which project from the flange for mounting the toilet bowl on the flange using nuts over washers on the stems and with an interposed ring seal between the receiving surface of the flange and the inside surface of the cover which comprises:
    (a) a plastic plate having a thin central round dome portion inside the position of the ring seal which with the ring seal covers and seals the tubular flange opening and toilet bowl receiving surface; and
    (b) two tubes with openings through the plate positioned on the plate to receive the stems of the bolts mounted on the flange in the slots so that the stems project above the tubes sufficiently to receive a nut over a washer on the stem and so as to essentially cover the threads on the stem, wherein the thin central dome portion of the cover when bolted to the flange tends to tighten the seal between the flange and cover when hydrostatic pressure is applied.

2. The cover of claim 1 wherein the ring seal is flat and is mounted on the inside of the plate around the dome portion to provide the seal with the flat surface of the flange when the cover is bolted to the flange.

3. The cover of claim 2 wherein the thin central round dome portion inside of and adjacent to the ring seal has integral reinforcing ribs in a radially directed x pattern on the inside surface of the cover and wherein additional ribs are provided around the dome portion in a radially directed x pattern on the outside surface of the cover.

4. The cover of claim 1 wherein the tubes have a rectangular cross-sectioned opening adapted to receive a bolt having a rectangular cross-sectioned head.

5. The cover of claim 4 wherein the openings in the tubes taper away from the plate such that bolt heads with projections on two opposing sides for loosely holding the bolt in the slot in the flange can be inserted into the tube openings.

6. A cover with an inside surface and an outside surface adapted for closure of a toilet bowl mounting flange mounted on a drain pipe having a tubular flange opening leading to the drain pipe and having a flat toilet bowl receiving surface with two slots for inserting and holding bolt heads having threaded bolt stems which project from the flange for mounting the toilet bowl on the flange using nuts over washers on the stems with an interposed ring seal between the receiving surface of the flange and the inside surface of the cover which comprises:

(a) a plastic plate which covers and seals the tubular flange opening and toilet bowl receiving surface with a thin central portion which with the ring seal tends to tighten the seal between the cover and the flange when hydrostatic pressure is applied; and (b) two tubes with openings through the plate positioned on the plate to receive the stems of the bolts mounted on the flange in the slots so that the stems project above the tubes sufficiently to receive a nut over a washer on the stem and so as to essentially cover the threads on the stem.

* * * * *